United States Patent [19]
Litchford et al.

[11] Patent Number: 5,140,328
[45] Date of Patent: Aug. 18, 1992

[54] VIRTUAL SECONDARY SURVEILLANCE RADAR USING SIGNALS OF REMOTE SSR

[75] Inventors: George B. Litchford, Northport; Burton L. Hulland, Long Beach, both of N.Y.

[73] Assignee: Litchstreet Company, Northport, N.Y.

[21] Appl. No.: 638,083

[22] Filed: Jan. 7, 1991

[51] Int. Cl.$^5$ .......................... G01S 13/80; G01S 5/12
[52] U.S. Cl. ........................................ 342/37; 342/42; 342/465
[58] Field of Search ................ 342/37, 42, 453, 463, 342/465, 126, 125, 32

[56] References Cited
U.S. PATENT DOCUMENTS

| | | | |
|---|---|---|---|
| 2,515,332 | 7/1950 | Budenbom | 342/126 |
| 4,115,771 | 9/1978 | Litchford | 342/37 |
| 4,733,241 | 3/1988 | Litchford et al. | 342/453 |
| 4,789,865 | 12/1988 | Litchford | 342/455 |
| 4,899,156 | 2/1990 | Litchford et al. | 342/37 |

Primary Examiner—Gilberto Barrón, Jr.
Attorney, Agent, or Firm—Brumbaugh, Graves, Donohue & Raymond

[57] ABSTRACT

A virtual secondary surveillance radar (VSSR) of the type described in U.S. Pat. No. 4,115,771 can produce inaccurate or indeterminate range information for a transponder positioned on or near a line between the actual SSR and the VSSR, owing to unfavorable geometrical relationships. This can be avoided by receiving the SSR interrogation and reply signals at two or more separated locations and processing the signals to provide positional information at a display site. No radar transmissions other than those of the existing ATCRBS are required.

8 Claims, 3 Drawing Sheets

| # VIRTUAL SECONDARY SURVEILLANCE RADAR USING SIGNALS OF REMOTE SSR

BACKGROUND OF THE INVENTION

This invention relates to radiolocation, as of mobile vehicles such as aircraft equipped with transponders, and more particularly to improvements on the invention described in U.S. Pat. No. 4,115,771. The system of the '771 patent provides essentially all the information that would be available with an actual secondary surveillance radar (SSR) located at the site of the virtual secondary surveillance radar (VSSR), without transmitting any additional signals, and at a fraction of the cost of an actual SSR. Under certain geometrical conditions, the information regarding range of a target craft from the VSSR can become inaccurate or indeterminate. One solution to this problem is described in U.S. Pat. No. 4,899,156. However, the system of that patent requires occasional radar transmissions in addition to those of the standard air traffic control radar beacon system (ATCRBS).

SUMMARY OF THE INVENTION

According to the present invention, two or more VSSR receiver stations are situated at separate known locations in different directions from the SSR, each providing differential time of arrival (t) and differential azimuth information (A) regarding any transponder target within the SSR service area, and identification (ID) and barometric altitude (ALT), when available.

The data available from plural VSSR receivers at separate locations is used to resolve the range ambiguity problem without additional radar transmissions, and also enables general improvement in the accuracy of determination of transponder target position.

DESCRIPTION OF EXEMPLARY EMBODIMENTS

Figure 1:
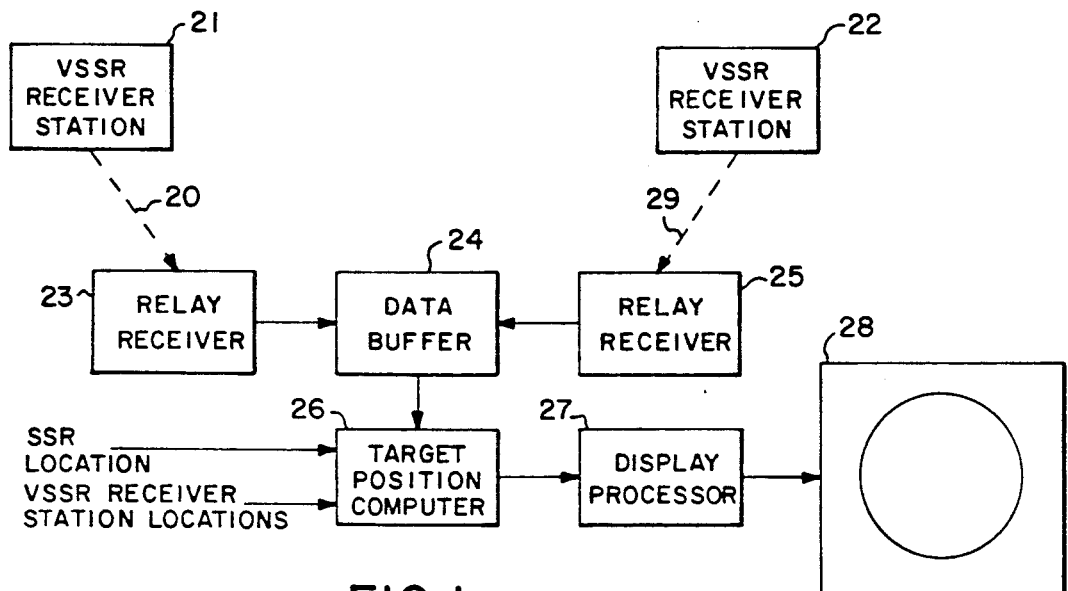
FIG. 1 is a block diagram of a presently preferred embodiment of the invention.

Referring to FIG. 1, VSSR receiver stations 21 and 22 are disposed at respective known locations in substantially different directions from the SSR with which they are to cooperate. They are coupled through data relay links 20 and 29 to relay receivers 23 and 25 at a VSSR processing and display station at any convenient location. The VSSR processing and display station may be co-located with one of the VSSR receiver stations, in which case the respective data relay link may be omitted. The relay links may be in the form of telephone lines, communications radios or fiber optics, for example.

Figure 2:
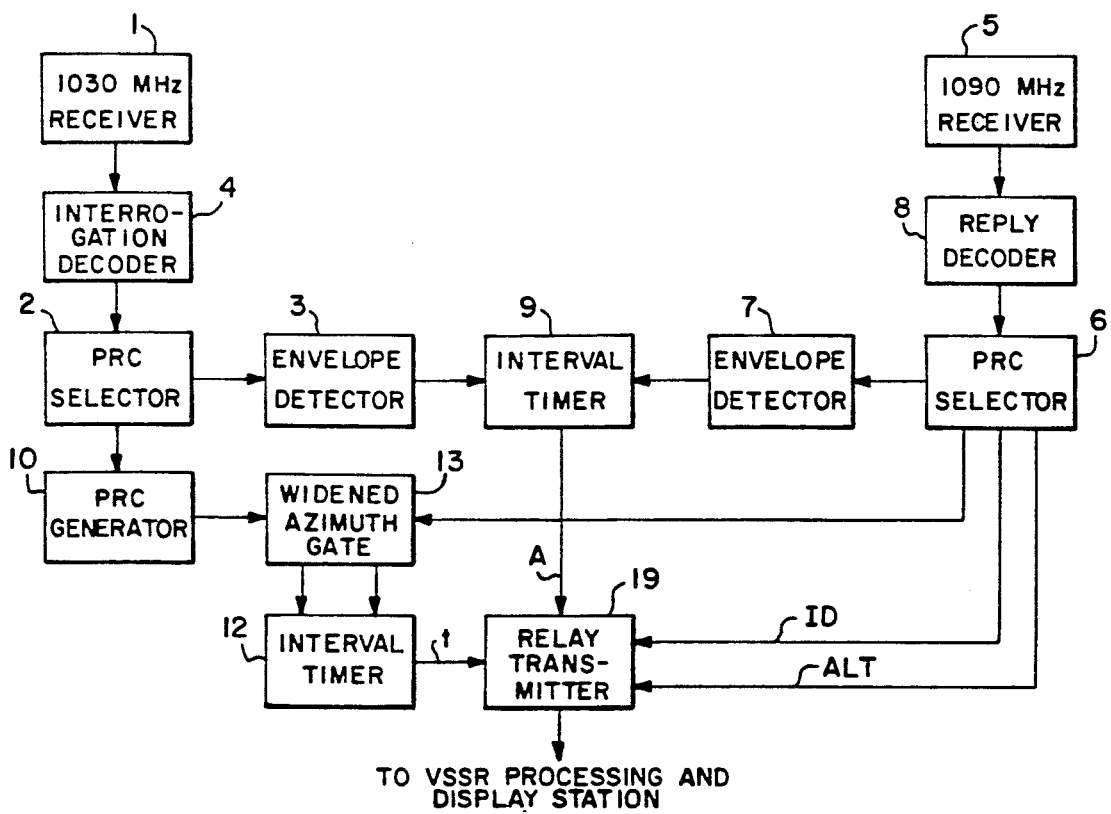
FIG. 2 is a block diagram of a VSSR receiver system forming part of the system of FIG. 1.

Referring to FIG. 2, each VSSR receiver station comprises 1030 MHz and 1090 MHz receivers 1 and 5, interrogation and reply decoders 4 and 8, pulse repetition characteristic (PRC) selectors 2 and 6, envelope detectors 3 and 7, interval timer 9, PRC generator 10, widened azimuth gate 13, and interval timer 12. The widened azimuth window can have any angular width up to and including 360 degrees. All of these elements are identical to and are interconnected in the same way as the correspondingly designated elements described in U.S. Pat. No. 4,115,771. As described in the '771 patent, the interval timer 9 produces an output representing the differential azimuth A of a target transponder with respect to the SSR and the VSSR receiver station, and the interval timer 12 produces an output representing the differential time of arrival t. The PRC selector 6 produces outputs representing the target identification ID and altitude ALT, if available. These outputs are applied to a relay transmitter 19 for transmission to a corresponding relay receiver at the VSSR processing and display station.

Figure 6:
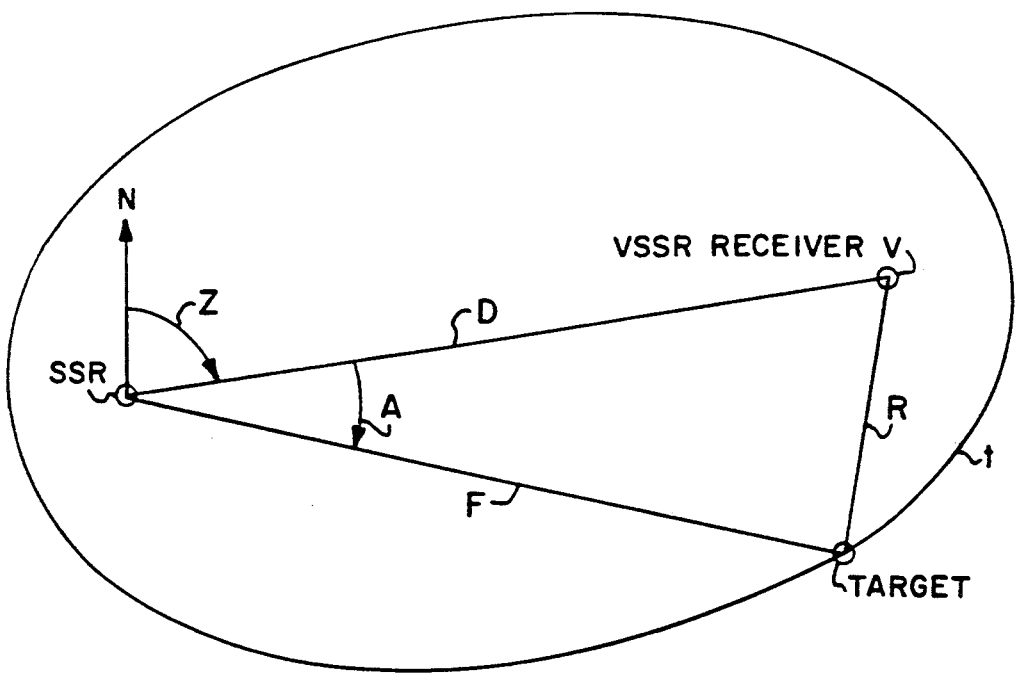
FIG. 6 shows the geometry of a single receiving station to define the terms and measurements used in the explanation of the invention.

Referring to FIG. 6, the differential azimuth A is defined as the angle between the line from the SSR to the VSSR receiver V and the line from the SSR to the transponder target T. It is measured by noting the time between the passage of the radar beam at the VSSR receiver V and the passage at the target T (as indicated by the replies from the target), and dividing by the scan period. The differential time of arrival t is defined as the difference between the path length F from the SSR to the target T and then the path R to the VSSR receiver V and the path length D from the SSR to the VSSR receiver V, divided by the speed of light c $[(F+R-D)/c]$. It is measured by noting the time between the arrival of an interrogation at V and the arrival of the reply to that interrogation at V. The location of the VSSR receiver V would typically be measured as a bearing Z and a distance D from the SSR.

Returning to FIG. 1, relay receivers 23 and 25 cooperate with the relay transmitters at VSSR receiver stations 21 and 22 to reproduce the A, t, ID and ALT data determined by the respective VSSR receiver stations. The successive sets of data provided by each VSSR receiver station are applied to a data buffer 24, which comprises a group of registers, each arranged to store associatively the A, t, ID and ALT data relating to a particular detected target. As each such set of data is completed, the buffer 24 presents it to a target position computer 26. When the computer 26 has completed any currently ongoing calculations and is free to do so, it accepts the next presented data set and releases the respective buffer register for accumulation of another set. The computer 26 may be a small general purpose computer or a dedicated device, programmed in known manner to calculate the positions, with reference to that of the SSR, of any targets within the SSR service area. Having such position data, it is apparent that the positions of the targets may also be computed in computer 26 with respect to another reference position at a known location, e.g., one of the VSSR receiver stations or the VSSR processing and display station, as desired.

The position of the target may be calculated from the differential time of arrival t and differential azimuth A, as described in U.S. Pat. No. 4,115,771, by solving for the intersection between an ellipse having foci at the SSR and a VSSR receiver station, and a line at the differential azimuth angle A from the major axis of the ellipse. The computer 26 may be arranged to provide the target position data in the form of distance F and direction A plus Z from the SSR, for example. Ideally, the target position data would be duplicated at the two (or more) VSSR receiver stations. Actually, they will ordinarily differ somewhat, because the measurements of A and t are subject to systemic errors, amounting typically to about one quarter degree and one tenth microsecond, respectively. If there were no such errors, the A values would differ by exactly the angular spacing between the various VSSR receiver stations as seen from the SSR. The computer 26 may be programmed to take advantage of multiple position data sets as by averaging them or, in general, applying more sophisticated statistical techniques to provide improved estimates of true target positions.

The target position data, together with the associated ID and ALT data, are applied to a display processor 27, for display by device 28. The processor 27 and display device 28 may be like the corresponding elements used with conventional SSRs. Although the data buffer 24 and target position computer 26 are shown and described herein as separate elements, all of their functions may be performed by a single appropriately programmed computer.

Figure 3:
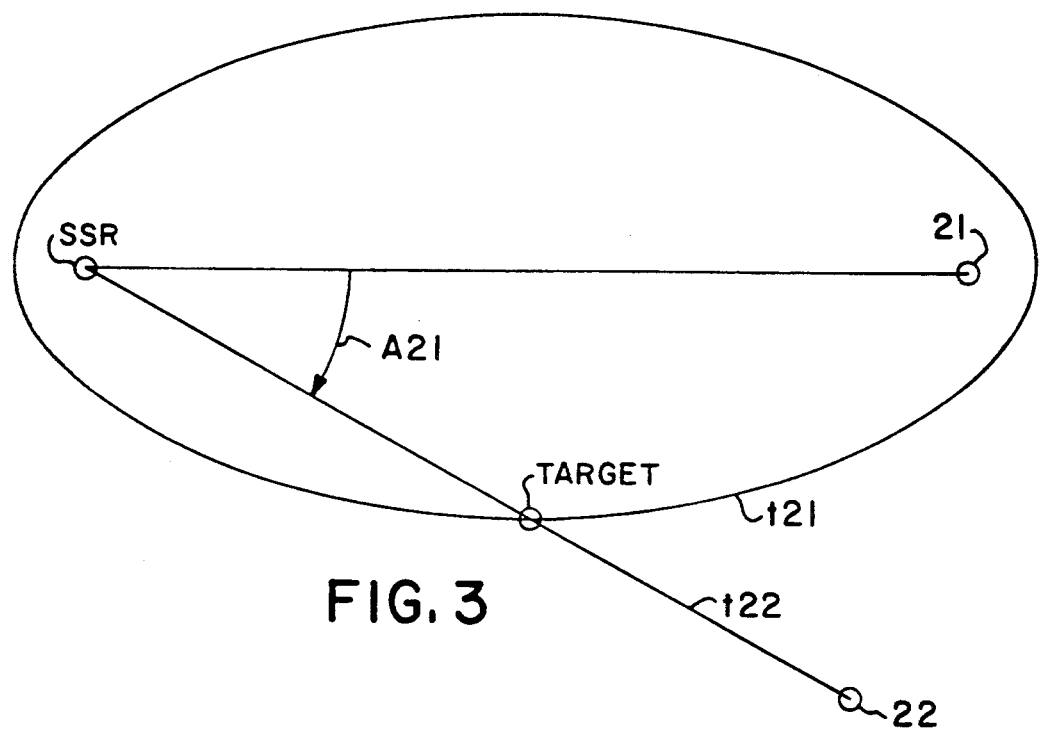
FIGS. 3, 4 and 5 are geometrical diagrams used in explaining the operation of the invention.

As described in U.S. Pat. No. 4,899,156, if a target lies on or near the line between the SSR and a VSSR receiver station, determination of its range from the differential azimuth A and differential time of arrival t data becomes inaccurate or impossible as the ellipse representing t becomes increasingly narrow. In the extreme case where the target is on the line, the value of t is zero and the corresponding ellipse is simply a line between the SSR and the VSSR receiver station. This situation is illustrated in FIG. 3, where the target is on the line between the SSR and the VSSR receiver station 22; A and t are both zero, and the target position cannot be determined solely from signals received at VSSR receiver station 22. At station 21, however, A and t are finite, providing a definite solution for the target position. The computer 26 may be programmed to simply discard data such as that from station 22.

Alternatively, the data from station 22 may be used in combination with that from station 21 to solve for the target position by determining the intersection between the t ellipses. In the special case of FIG. 3, where one of the ellipses is merely a straight line, the target is located at the intersection of that line with the other ellipse. In a more usual case such as that illustrated in FIG. 4, the target is located at one of the intersections between two ellipses. The correct intersection is determined by the differential azimuth A measured at either or both VSSR receiver stations. The target position may be computed by solving for the correct intersection of the two (or more) elipses.

Figure 4:
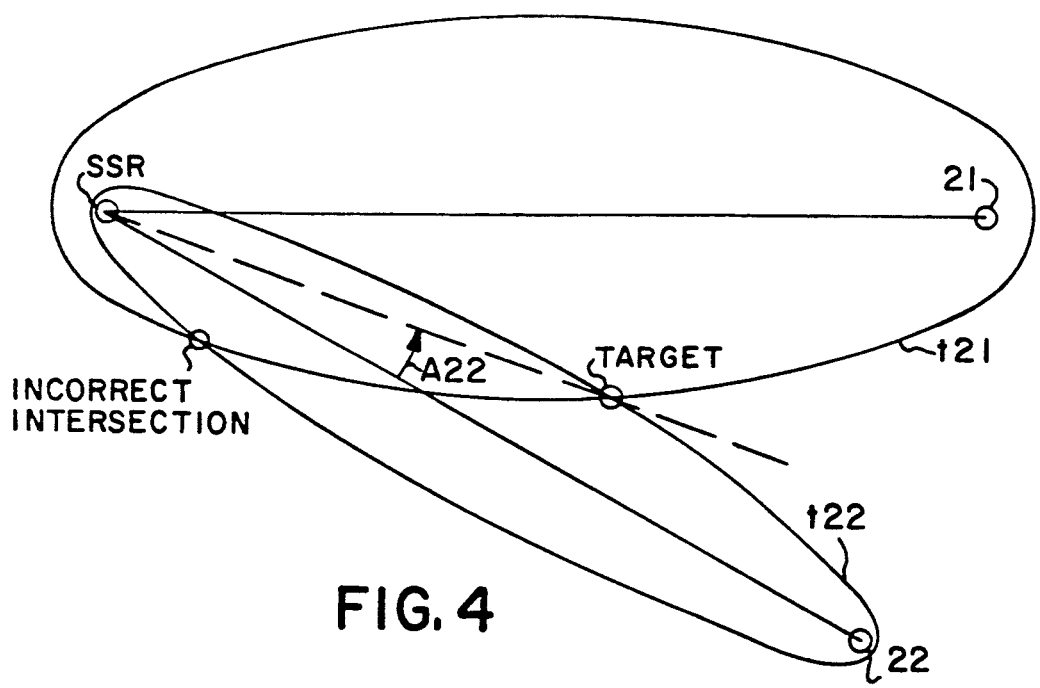
Figure 5:
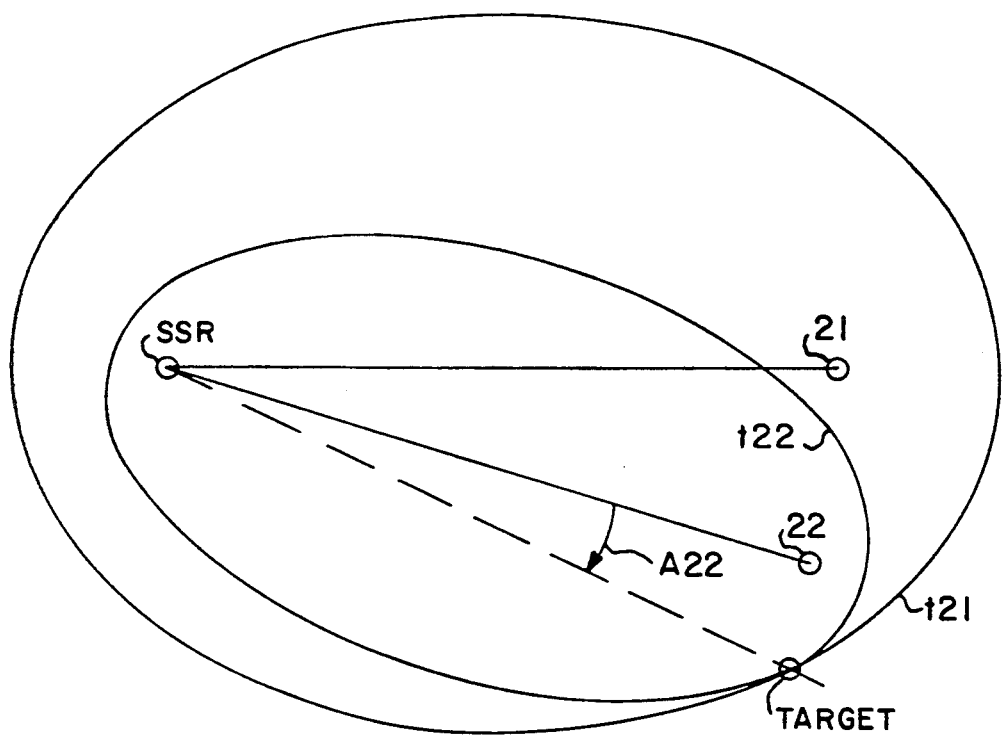

The target position in FIG. 4 may also be computed from A and t as received at station 21, and similarly from A and t as received at station 22. Ideally, the results of all such computations should be the same. In practice they will usually differ more or less, owing to the aforementioned systemic errors in the measurements of A and t. The typical 0.25 degree error in A, for example, results in an uncertainty of about 26 feet in target position at one mile from the SSR, but 260 feet at ten miles, and 1300 feet at 50 miles. The typical error of 0.1 microsecond in t amounts to an uncertainty of about 100 feet at all distances from the SSR. Accordingly, computations based on A and t data reflect the target position more accurately than those based on the intersection of the t ellipses when the target is within say about five miles (depending on the geometry of the SSR, VSSR receivers, and the target) from the SSR, but less accurately when the target is farther from the SSR. When the target is near the extension of the line joining the VSSR receivers, the ellipses intersect at smaller angles, as shown in FIG. 5, reducing the accuracy of position determination by that specific method.

The target position computer 26 may be programmed in known manner to calculate in multiple modes, using all available data, assign relative weights to the results on the basis of the approximate distance of the target from the SSR, and deliver weighted averages of the target position coordinates. Thus all the data is used to the extent of its reliability to provide a best estimate of target position without requiring additional radar transmissions.

In an alternative embodiment, a separate data buffer (like 24) and target position computer (like 26) might be provided at each VSSR receiver station, and the computed position transmitted via the relay transmitters and receivers to the VSSR processing and display station. The processing and display station would then either select the more accurate of the two (or more) computed positions for display, or would take a weighted average of them for display.

The embodiments above refer to display of the target positional data. In some applications this data might be recorded or transmitted to another computer for further processing, rather than being displayed.

We claim:

1. The method of determining the position of a transponder target within the service area of a secondary surveillance radar (SSR) with respect to a reference position at a known location, comprising the steps of
  (a) receiving interrogations from said SSR at two or more separate receiver stations at known locations in different directions from said SSR,
  (b) receiving transponder replies to said interrogations at said receiver stations,
  (c) determining the differential azimuth A and the differential time of arrival t of interrogations and replies from the target at each of said receiver stations to provide successive sets of A and t data from each receiver stations, and
  (d) computing from said sets of A and t data the position of the target with respect to said reference position.

2. The method claimed in claim 1, wherein said step (d) includes
  (e) solving for the intersection between each t-determined ellipse having foci at the known SSR location and at a respective known receiver station and a line at the differential azimuth angle A from the major axis of said ellipse to provide respective sets of target position data, and
  (f) combining said data sets to provide an estimate of the true target location.

3. The method claimed in claim 1, wherein said step (d) includes
  (g) solving for the intersections between each pair of t-determined ellipses having foci at the known SSR location and at the known receiver stations, and
  (h) selecting the correct intersection in each case as the one closest to the differential azimuth of the target.

4. The method claimed in claim 1, wherein said step (d) includes
  (i) using known statistical estimation techniques to compute a best estimate of the position of the target based on the various A-values and t-values and on the probable error of each of these measured values.

5. Apparatus for determining the position of a transponder target within the service area of a secondary surveillance radar (SSR) with respect to a reference position at a known location, comprising
- (a) means for receiving interrogations from said SSR at two or more separate receiver stations at known locations in different directions from said SSR,
- (b) means for receiving transponder replies to said interrogations at said receiver stations,
- (c) means for determining the differential azimuth A and the differential time of arrival t of interrogations and replies from the target at each of said receiver stations to provide successive sets of A and t data from each receiver station, and
- (d) means for computing from said sets of A and t data the position of the target with respect to said reference position.

6. The apparatus claimed in 5, wherein said means (d) includes
- (e) means for solving for the intersection between each t-determined ellipse having foci at the known SSR location and at a respective known receiver station and a line at the differential azimuth angle A from the major axis of said ellipse to provide respective sets of target position data, and
- (f) means for combining said data sets to provide an estimate of the true target location.

7. The apparatus claimed in claim 5, wherein said means (d) includes
- (g) means for solving for the intersections between each pair of t-determined ellipses having foci at the known SSR location and at the known receiver stations, and
- (h) means for selecting the correct intersection in each case as the one closest to the differential azimuth of the target.

8. The apparatus claimed in claim 5, wherein said means (d) includes
- (i) means for using known statistical estimation techniques to compute a best estimate of the position of the target based on the various A-values and t-values and on the probable error of each of these measured values.

* * * * *